S. T. FERGUSON.
Sulky-Plow.
No. 200,038. Patented Feb. 5, 1878.
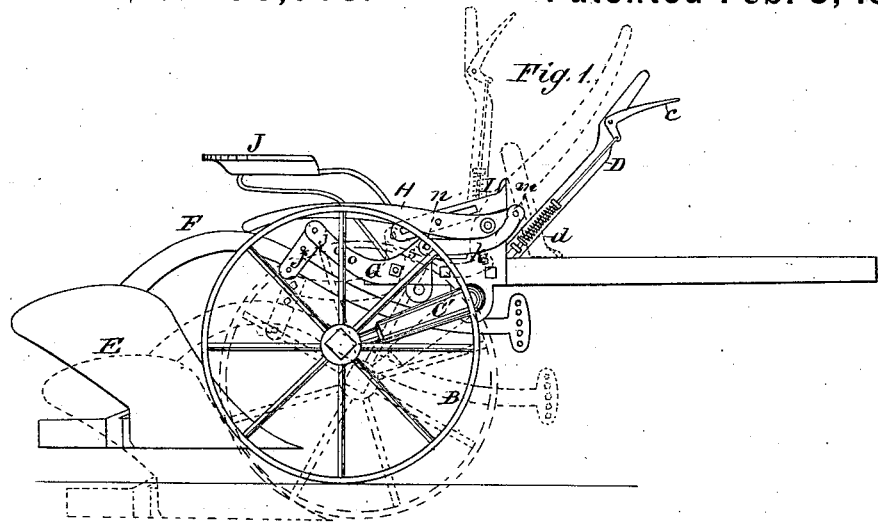
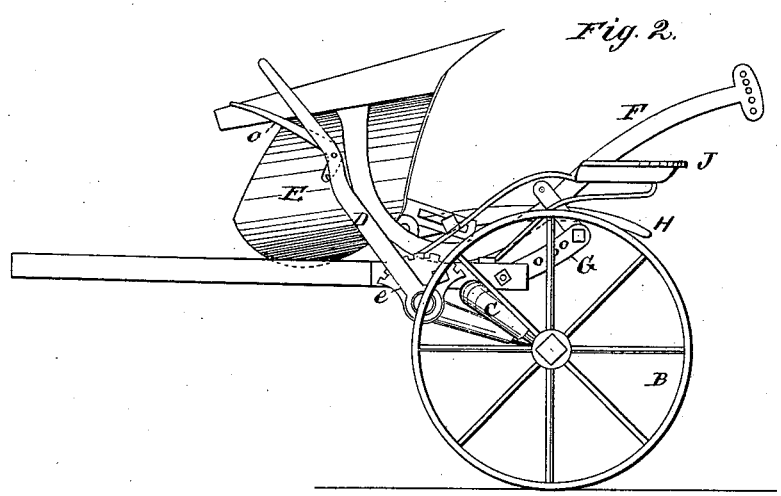
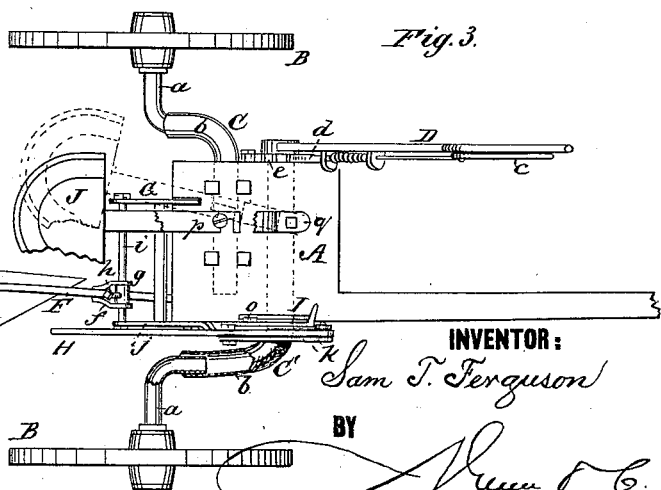
WITNESSES:
W. W. Hollingworth
E. deo. UxByrn
INVENTOR:
Sam T. Ferguson
BY
ATTORNEYS.

UNITED STATES PATENT OFFICE.

SAM T. FERGUSON, OF MINNEAPOLIS, MINNESOTA.

IMPROVEMENT IN SULKY-PLOWS.

Specification forming part of Letters Patent No. 200,038, dated February 5, 1878; application filed January 8, 1878.

*To all whom it may concern:*

Be it known that I, SAM T. FERGUSON, of Minneapolis, in the county of Hennepin and State of Minnesota, have invented a new and Improved Sulky-Plow; and I do hereby declare that the following is a full, clear, and exact description of the same, reference being had to the accompanying drawings, forming part of this specification, in which—

Figure 1 is a side elevation of the plow, showing the working position in dotted lines. Fig. 2 is a side elevation from the opposite side, showing the plow reversed upon the pivot for transportation. Fig. 3 is a plan view, showing in dotted lines the lateral adjustment of the seat.

My invention relates to certain improvements upon that form of sulky-plow in which two independent crank-arms are employed to sustain the frame-work upon the running wheels.

The invention consists, first, in extending the arms of the cranks past each other in parallel position, so as to form supports for the platform, one of the crank-arms being correspondingly lengthened, so as to bring the centers of the wheels into alignment; secondly, in the particular construction and arrangement of two tubular sections for forming the crank-arms; thirdly, the pivotal arrangement of the plow and its supporting-frame whereby the plow may be turned upside down above the platform for transportation; fourthly, the combination, with the lever for lifting the plow, of an adjusting device located on said lever for regulating the depth of the plow, all as hereinafter more fully described.

In the drawings, A represents the platform, B B the running wheels, and C C' the two crank-arms, which, together, constitute the running gear of the plow. Both of these crank-arms, C C', are bent twice at right angles, and, for greater strength and lightness, each is made of a larger tubular portion, $b$, and smaller tubular portion $a$, which latter parts, $a$, enter the ends of the larger tubular portions and project a sufficient distance to form bearings for and receive the wheels. The larger tubular portions of these two crank-arms are secured beneath the platform by staples, straps, or other devices, so that the one, C, is rigid and fixed, while the other is secured in bearings beneath the platform, which permit it to turn axially. The larger ends of these crank-arms are extended past each other in parallel position beneath the platform, as shown in dotted lines in Fig. 3, and thus constitute a basic support for said platform, so that the latter is held upon said support stiffly and not liable to turn, as would be the case if it were simply supported upon a continuous crank-axle. Of these two crank-arms the one, C, upon the land-side of the plow, which is fixed, is made with a smaller crank or radius, while the other, C', upon the opposite side, is made with a long crank or radius, and both, when in their normal positions, are arranged with these cranked or radial portions inclined forwardly and upwardly. This forward inclination is designed to throw the platform to the front, for convenience in getting on and off, and to bring the plow forward to its best working position and close to the driver's seat, with no portion of the frame intervening between said seat and plow, so that he may clear the plow with his paddle as it needs it, while the upward inclination is designed to raise the platform to a sufficient height to accommodate the plow when lifted.

D is a hand-lever, terminating in a head which is rigidly connected upon the land-side of the plow with the projecting end of the tubular crank-arm C'. This hand-lever is provided with an ordinary form of latch, $c$, connected with a spring-seated bolt, $d$, which enters a series of notches formed in a segmental plate, $e$, affixed to the platform, so as to hold the lever to its adjustment. As this lever is moved, it will be seen that the crank-arm C' is oscillated in its bearings, and the wheel attached to the same, which runs in the furrow upon the mold-board side of the plow, is raised or lowered to correspond to the depth of said furrow. In lowering the wheel for a deeper furrow it will be seen that the position of the crank causes the wheel to be moved forward, which gives a greater amount of room between the mold-board and wheel for the larger furrow-slice thrown over by the plow.

E is the plow, having a beam, F, which extends up under the platform. Said beam is fastened, by means of straps $f$, sleeve $g$, and set-screw $h$, to a pivot-rod, $i$, working loosely in a metal frame, G. The side bars of this frame are pivoted to the platform, and one of them, $j$, is bent to form an elbow, $s$, which is connected, through the curved links $k$, with the end of a hand-lever, H, pivoted to a support upon the platform on the right of the driver's seat, so that when the lever is drawn back and depressed the links $k$ exert a draft upon the elbow of the frame G, which rocks it upon its pivot and lifts the plow.

When very heavy plows are to be employed it is desirable to increase the leverage in lifting the same, and for this purpose the side bars of the frame G are perforated with adjusting-holes, and for heavy plows the pivot-bar $i$ is adjusted nearer the pivots of the frame, thus increasing the leverage and lessening the throw of the frame. This adjustment is, however, only desirable where heavy plows are used for shallow furrows, as upon prairie-lands, where a less vertical movement of the plow is necessary. This pivotal connection of the plow to the lifting-frame G, it will be seen, is immediately above the point of the plow, as seen in Fig. 1, and as the point of the plow is the natural pivot of the same, when in operation, upon which the plow tilts or oscillates, the pivoting of the plow-beam to the lifting-frame, just above the point, makes the connection to the frame less stiff and more flexible to the draft exerted upon its forward end, and also permits the plow to be easily turned over into a reversed position.

To sustain the plow in an elevated position, and at the same time make the lever devices self-locking from the weight of the plow, the front ends of the links $k$ are curved upwardly, so that when the lever is thrown entirely down, and the plow is in its elevated position, a straight line between the pivots $m$ and $n$ will be upon the opposite side of the lever-pivot from the links.

To regulate the depth of the furrow more accurately and conveniently than may be done by the draft-clevis, a slotted gage-bar, I, is fastened to the lever H by a set-screw, $o$, and is provided with a foot, which, when the lever is moved forward, strikes against the platform, and defines said forward movement of the lever, and consequently the degree of downward adjustment of the plow, the slot and set-screw permitting the position of the gage-bar to be changed to regulate said adjustment.

In relation to the pivoted arrangement of the plow with the lifting-frame G, it will be seen that this permits the plow to be turned entirely around and upside down above the platform, in which position the plow may be more easily transported without danger of striking obstructions, and in which position, also, the mold-board surface is protected from rust due to the fall of rain and dew. To accommodate this position of the plow, however, the driver's seat J (when placed centrally above the platform, which position I prefer) is required to be slightly moved to one side, and for this purpose a slot, $p$, is formed in one of the supporting-springs of the said seat, which allows the said spring to be moved laterally from its fastening bolt or screw upon the bolt $q$ as a center.

In defining more clearly my invention, I would state that independent crank-arms of different radii, tubular axles, and gage-bars for adjusting the depth of the plow, have been heretofore used; and I therefore only claim the particular construction and arrangement of these features shown and described—to wit: the extension of the crank-arms, having different lengths of crank or radius, past each other to form a support for the platform; the bending of two tubular sections of different diameters, and the insertion of the one within the other, with the joint in the radial portion to form the crank-arm; and the location of the adjusting device on the lifting-lever, which causes it to regulate the depth of the plow by acting backward through the lifting mechanism, thus securing an integral and flexible adjustment of the plow.

Having thus described my invention, what I claim as new is—

1. The independent crank-arms C and C′, having different lengths of crank or radius, combined with the running-wheels and the platform, and extended past each other in parallel position, to form a stiff support for said platform, as described.

2. The crank-arms, made of bent tubular sections $a$ and $b$, of different diameters, secured the one within the other, with the joint in the radial portion, substantially as described.

3. The plow, pivoted to its supporting-frame, as described, so as to swing over the platform in a reversed position, in combination with a laterally-adjustable seat, substantially as and for the purpose described.

4. The combination, with an adjustable lifting-frame, substantially as described, of a plow, having its beam pivoted to said frame in the rear of its draft-connection, so as to swing over the platform in a reversed position, as and for the purpose set forth.

5. The slotted and adjustable gage-bar I, located upon the lever H, and provided with a foot or stop, in combination with the platform, the lever, and the plow, for the purpose of adjusting the latter as to depth, as set forth.

SAM T. FERGUSON.

Witnesses:
 EDW. W. BYRN,
 SOLON C. KEMON.